United States Patent [19]

Yoshikawa et al.

[11] Patent Number: 4,686,143

[45] Date of Patent: Aug. 11, 1987

[54] OPTICAL INFORMATION RECORDING MEDIUM

[75] Inventors: Tadao Yoshikawa; Shiro Nagata, both of Kurashiki, Japan

[73] Assignee: Kuraray Co., Ltd., Kurashiki, Japan

[21] Appl. No.: 814,501

[22] Filed: Dec. 30, 1985

[30] Foreign Application Priority Data

| Dec. 28, 1984 [JP] | Japan | 59-276389 |
| Jan. 4, 1985 [JP] | Japan | 60-69828 |
| Mar. 25, 1985 [JP] | Japan | 60-61418 |

[51] Int. Cl.$^4$ .................... B32B 9/04; G01D 9/00
[52] U.S. Cl. .................. 428/411.1; 346/76 L; 346/135.1; 346/137; 428/913
[58] Field of Search ................. 430/553, 945; 428/411.1, 913, 195, 199; 346/135.1, 137, 76 L

[56] References Cited

U.S. PATENT DOCUMENTS

| 4,134,766 | 1/1979 | Kikuchi et al. | 430/553 |
| 4,626,361 | 12/1986 | Molaire | 430/945 X |

*Primary Examiner*—Thomas J. Herbert
*Attorney, Agent, or Firm*—Oblon, Fisher, Spivak, McClelland & Maier

[57] ABSTRACT

An optical information recording medium, comprising a substrate and a recording layer, the recording layer containing a metal complex of a monoazo compound of the formula:

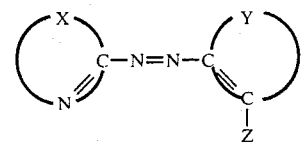

wherein X is a residue which, taken together with the adjacent nitrogen atom and carbon atom, forms a heterocyclic ring; Y is a residue which, taken together with the two adjacent carbon atoms, forms an aromatic ring; and Z is hydroxy or carboxy.

29 Claims, 9 Drawing Figures

OPTICAL INFORMATION RECORDING MEDIUM

BACKGROUND OF THE INVENTION

1. Field of the Invention

This invention relates to a novel high-sensitivity, high-density optical information recording medium which is adapted for the recording and readout of information by means of laser light. More particularly, this invention relates to an optical information recording medium which is suitable for the recording and readout of information through utilization of the change in reflectivity or transmittance which is produced in areas of the reading medium which have been exposed to high-density energy laser beams, said areas being local deformations or areas from which recording medium has been removed by fusion, decomposition or the like of the recording layer.

2. Discussion of the Background

Since laser-beam recording and reading does not involve the use of a contact-type scanning head, laser beam use has the advantage that the recording material is not worn or damaged by contacting elements, and much research work has been undertaken to develop a variety of optical information recording materials. Thus far, particularly in the fields of optical disks, laser printers, facsimile devices, and the like, many laser beam recording materials are known already. It is known that metallic materials such as Te, Bi, In, Ge, and the like, or their alloys or oxides can be used as laser-absorbing materials in the recording layer of a recording medium. However, metallic materials not only have high thermal conductivities and melting points, but they have large surface reflectivities so that laser energies cannot be utilized effectively. Another serious disadvantage of such metallic materials is their toxicity.

With regard to non-metallic optical information recording materials, it is known that organic dyes such as fluorescein, Sudan Black B, Congo Red, Sudan Blue, Rhodamine 6G, and the like can be used as laser-absorbing materials (see Japanese Patent Laid-Open Publication No. 56-55289 and Japanese Patent Publication No. 57-20919). Because the thermal conductivities of organic materials are as low as one-tenth to one-hundredth of those of metals, the heat generated by photothermal conversion can be effectively utilized and, moreover, since the dissipation of heat in horizontal directions in low, organic materials permit faithful recording of signals, i.e. high-density recordings can be obtained. However, because the known organic materials absorb mainly in the visible region of the spectrum, the compatible laser beam sources are limited to $Ar^+$ laser (488 nm), He-Ne laser (633 nm) and the like. Thus, organic materials are not suitable for use with semiconductor lasers, which have oscillation wavelengths in the near infrared region (~800 nm) of the spectrum. Therfore, the organic laser absorbing materials do not permit the design of compact and light-weight equipment.

Examples of organic compounds which absorb in the near-infrared region of the spectrum include cyanine dyes, for instance, which have been disclosed in the literature such as Japanese Patent Laid-Open Publication No. 58-114989. However, cyanine dyes have the disadvantage that, since they are labile in the presence of water, oxygen or light, they do not permit the long-term stability of stored information.

As mentioned above, the organic optical recording materials which have been thus far proposed exhibit various drawbacks such as insufficient light absorptivity or reflectivity, inadequate durability, insufficient storage stability, and the like, and none of them fully meet the performance requirements for optical information recording materials. A need therefore continues to exist for recording materials of increased compatibility with laser light.

SUMMARY OF THE INVENTION

Accordingly, one object of the present invention is to provide a high-sensitivity, high-density organic optical information recording medium which is capable of providing a high CNR (carrier to noise ratio) value at a low level of laser output.

Another object of the present invention is to provide an optical information recording medium with which recording and reading can be accomplished with a semiconductor laser which has an oscillation wavelength in the near-infrared region (~800 nm) of the spectrum.

Still another object of the present invention is to provide an optical information recording medium which is durable and which is capable of providing for the storage of recorded information with high stability.

Yet another object of the present invention is to provide an optical information recording medium which can be manufactured with high productivity.

Briefly, these objects and other objects of the present invention as hereinafter will become more readily apparent can be attained by an optical information recording medium which comprises a substrate and a recording layer which contains a metal complex of a monoazo compound having the formula (I):

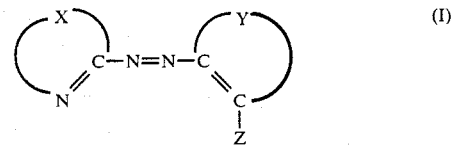

(I)

wherein X is a residue which, taken together with the adjacent nitrogen atom and carbon atom, forms a heterocyclic ring which optionally may be substituted by at least one electron donor group or electron withdrawing group; Y is a residue which, taken together with the two adjacent carbon atoms, forms an aromatic ring, which optionally may be substituted by at least one electron donor group; and Z is hydroxy or carboxy.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a plot showing the relationship between absorption (A), reflectivity (R) and transmittance (T) as a function of the thickness of the recording layer on a

DETAILED DESCRIPTION OF THE PREFERRED EMBODIMENTS

Figure 1:
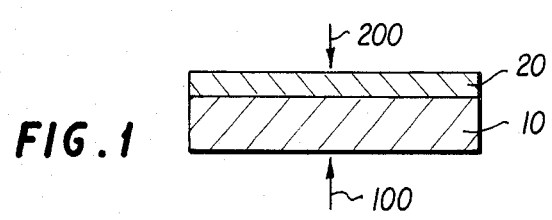
FIGS. 1-6 are cross sectional views individually showing structures of various embodiments of the recording medium of the present invention.

Extensive research, which has been conducted, has led to the finding that some metal complexes of monoazo compounds have high molar absorptivities and that when a recording medium containing such a metal complex is exposed to a laser beam, a photo-thermal conversion reaction takes place with high efficiency to produce a marked change in reflectivity or transmittance in the area of the recording medium exposed to the laser beam. The present invention has been accomplished on the basis of these findings.

Suitable electron donor groups in the monoazo compound of formula (I) include, for example, lower monoalkylamino groups of up to 4 carbon atoms such as monomethylamino, monoethylamino, monobutylamino, and the like; lower dialkylamino groups of up to 4 carbon atoms such as dimethylamino, diethylamino, dibutylamino, and the like; lower alkoxy groups of up to 4 carbon atoms such as methoxy, ethoxy, and the like; lower alkyl groups of up to 4 carbon atoms such as methyl, ethyl, and the like, amino and hydroxy. Preferred examples of electron donating groups, in cases where Z is hydroxy, are dimethylamino, diethylamino, hydroxy, methoxy and methyl, and in cases where Z is carboxy, the preferred electron donating groups are dimethylamino, diethylamino and hydroxy. The electron donating groups may be the same or different.

Further with respect to the monoazo compound of formula (I) suitable electron withdrawing groups include, for example, a halogen atom such as chloro, bromo, and the like; nitro, cyano, trifluoromethyl and carboxy. Preferred groups are chloro, bromo and nitro. The electron withdrawing groups may be the same or different.

Suitable heterocyclic ring portions of the monoazo compound include, for example, pyridyl, thiazolyl, benzothiazolyl, quinolyl, pyrimidyl or hydroxybenzothiazolyl. The preferred heterocyclic ring systems are thiazolyl and benzothiazolyl. Suitable aromatic ring portions of the monoazo compound include phenyl, naphthyl and the like. When the aromatic ring is phenyl, it is desirably substituted by at least one of said electron donating groups. The electron donating groups not only produce an auxochromatic effect, but also contribute to the stability of the complex.

Preferred examples of the monoazo compound which may be used to form the complex of the present invention, wherein Z is hydroxy, include:

(1) Thiazolylazo compounds such as

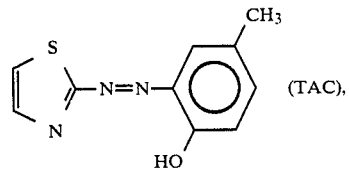
(TAC),

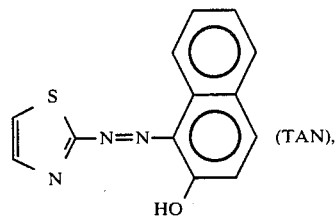
(TAN),

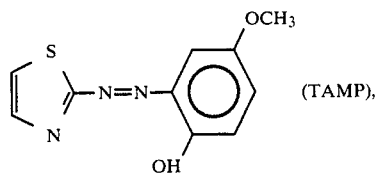
(TAMP),

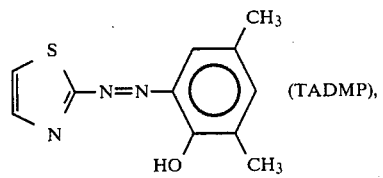
(TADMP),

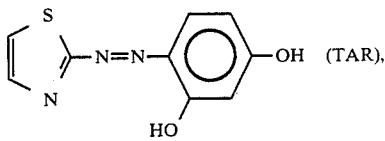
(TAR),

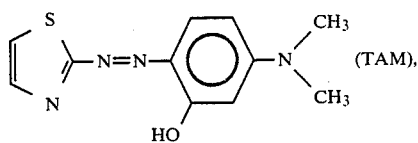
(TAM),

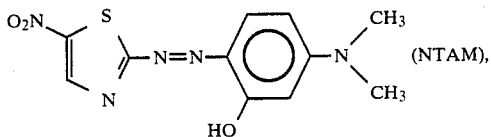
(NTAM),

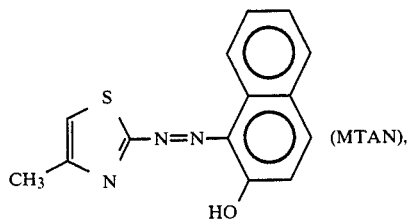
(MTAN),

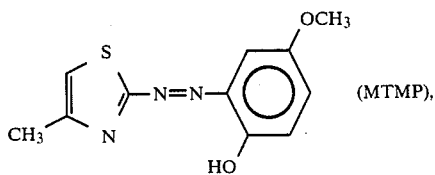
(MTMP),

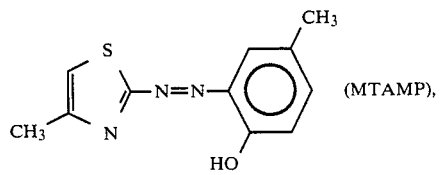
(MTAMP),

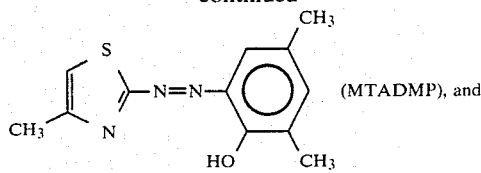 (MTADMP), and
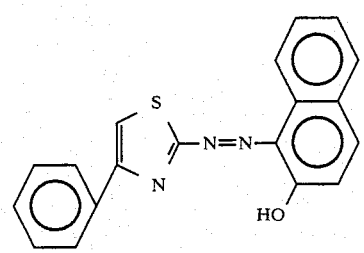 (PTAN);
(2) Hydroxybenzothiazolylazo compounds such as
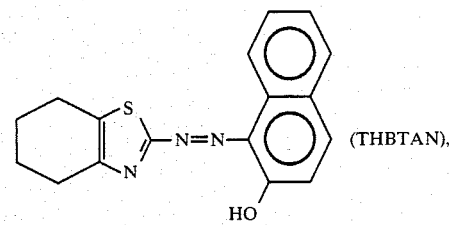 (THBTAN),
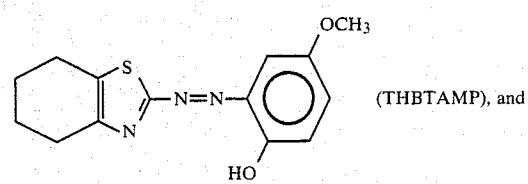 (THBTAMP), and
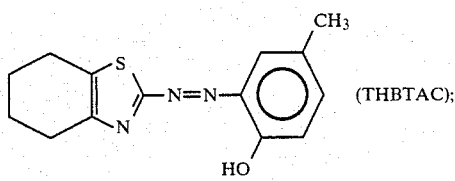 (THBTAC);
(3) Benzothiazolylazo compounds such as
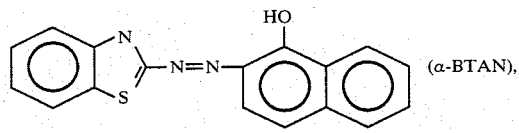 (α-BTAN),
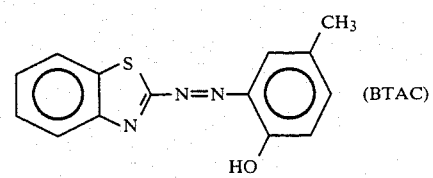 (BTAC)
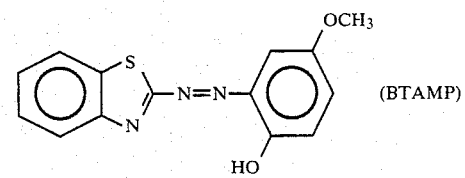 (BTAMP)
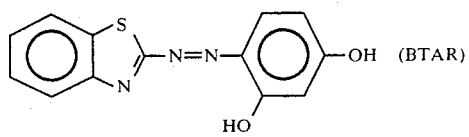 (BTAR)
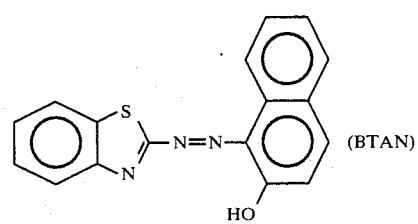 (BTAN)
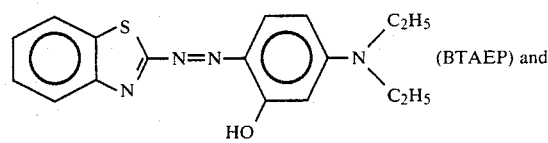 (BTAEP) and
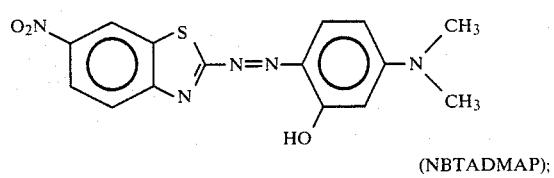 (NBTADMAP);
(4) Pyridylazo compounds such as
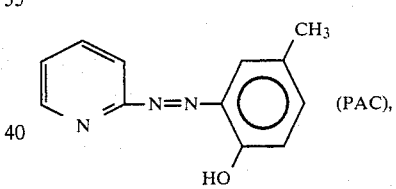 (PAC),
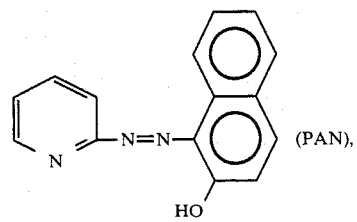 (PAN),
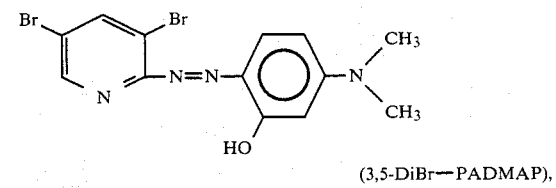 (3,5-DiBr—PADMAP),
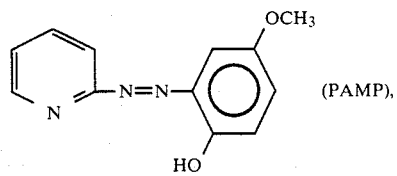 (PAMP),

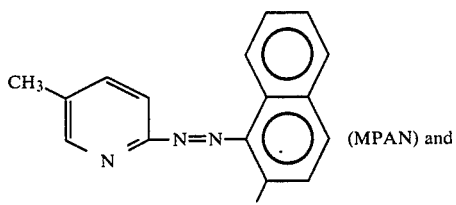

(MPAN) and

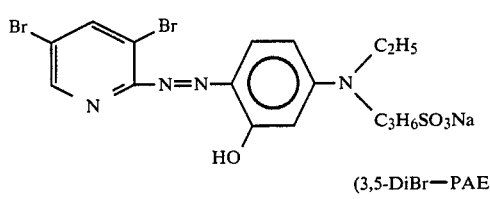

(3,5-DiBr—PAEPEP);

(5) Quinolylazo compounds such as

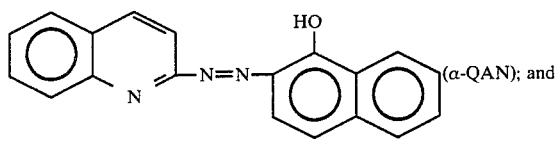

(α-QAN); and (6) Pyrimidylazo compounds such as

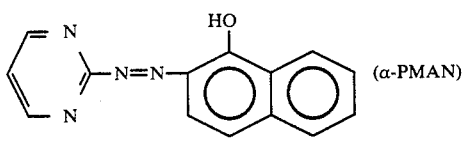

(α-PMAN)

Preferred examples of said monoazo compounds, when Z is carboxy, include:

(1) Thiazolylazo compounds such as

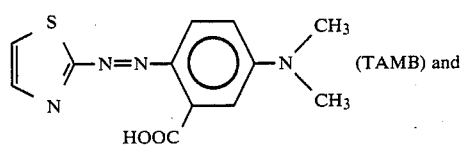

(TAMB) and

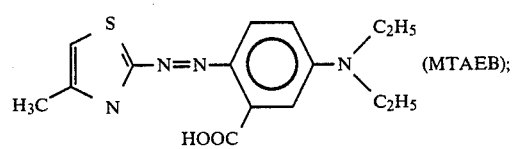

(MTAEB);

(2) Benzothiazolylazo compounds such as

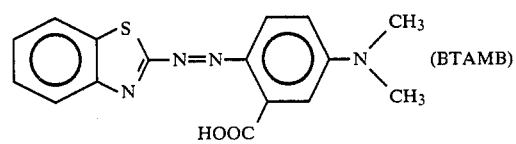

(BTAMB)

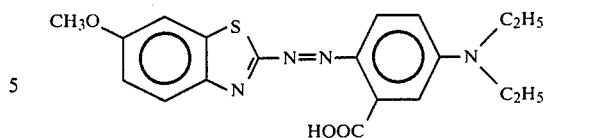

(MBTAEB) and

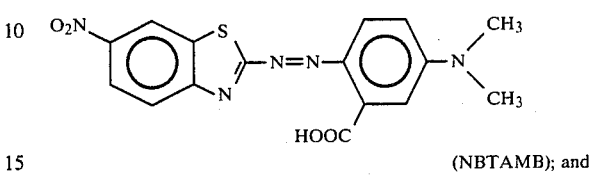

(NBTAMB); and (3) Pyridylazo compounds such as

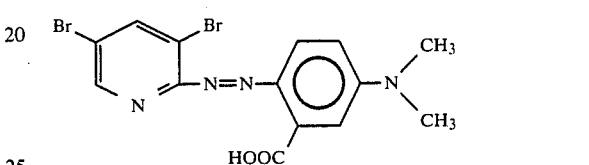

(3,5-DiBr—PAMB) and

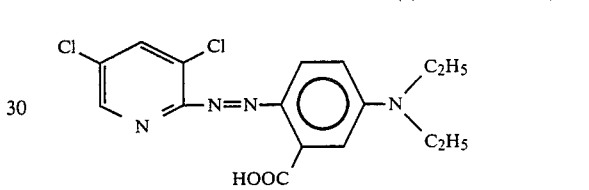

(3,5-DiCl—PAEB)

The compounds of the invention can be synthesized by the processes described in Bunseki Kagaku, 11, pp. 621-628 (1962) and Nippon Kagaku Zasshi 83, 11, pp. 1185-1189 (1962), for instance.

The metals which form complexes with the monoazo compound of the present invention are not particularly limited. It is only necessary that they be able to form complexes with the monoazo compound. However, preferred metals include iron, cobalt, nickel and copper.

The metal complexes of the invention generally have an absorption maximum ($\lambda$max) on the longer wavelength side in comparison to the monoazo compound itself and the complexes have a higher molecular absorptivity ($\epsilon$) than the monoazo compound itself. The consequence of these facts is that the present complex absorbs laser light with high efficiency which causes photo-thermal conversion. Particularly, the complex with divalent iron is of great practical use, for it has a $\lambda$max value in the longer wavelength region and a large $\epsilon$ value in the semiconductor laser wavelength region. While this characteristic absorption band is not assignable for certain, it is probably due to the charge-transfer of the iron atom's 3d electrons.

The ratio of monoazo compound to metal in the complex of the invention is generally stoichiometric at 1:1, 2:1 or the like. However, since the optical characteristics of the complex may depend on this ratio, the ratio is selected depending upon the application intended for the complex.

The metal complex of the monoazo compound of the present invention may be synthesized by any desired process. For example, the complex can be produced by reacting one or more monoazo compounds of formula (I) with one or more metal salts (as described below) in water and/or an organic solvent.

Suitable metal salts which can be employed in the synthesis of the metal complex include, among others, the chloride, hydroxide, nitrate, sulfate, phosphate, ammonium sulfate, oxalate, perchlorate, acetate, formate, carbonate, stearate and borate salts of said metal.

The recording layer of the optical information recording medium of the present invention consists of the metal complex of the monoazo compound alone or in combination with one or more other component materials, and is formed on a substrate made of an inorganic material such as glass, aluminum, a ceramic, or the like, or of a synthetic resin such as poly(methyl methacrylate), a polycarbonate, a polyester, or the like. The substrate should be either transparent or translucent and should have spectral characteristics suitable for the incident direction of recording and reading laser beams. The incidence of light energy from the transparent substrate side of the recording medium is particularly desirable, because in this circumstance the recording and readout of information are then not influenced by dust particles or flaws on the surface. It is also possible to provide an "air sandwich structure" recording medium which consists of a couple of disk-shaped transparent substrates positioned face-to-face with their respective recording layers facing each other and an air gap provided therebetween. The substrate may be disk-, tape-, sheet- or otherwise shaped. When it is disk-shaped, it may be pre-grooved for smooth tracking.

If necessary, the metal complex which forms the recording layer may be a complex of two or more different monoazo compounds and two or more different metal elements. Such a mixture of complexes enables one to select or adjust the absorption wavelength desired.

The recording layer can be formed by vacuum deposition or by the steps of dissolving the metal complex, alone or in combination with other components such as resins, in a suitable solvent, and by applying the resulting solution by a suitable technique such as spin coating, dip coating, bar coating, casting, or the like to a substrate. In these processes, a surfactant, dispersing agent, leveling agent, stabilizer, or the like may be utilized as ingredients, if necessary.

The thickness of the recording layer so formed is preferably in the range of 10 to 500 nm and the transmittance of the layer to the recording laser beam is preferably less than 70 percent. If the transmittance of the recording layer exceeds 70 percent, it does not exhibit a sufficient laser absorbing or reflecting capacity.

The resin which is used to form the optical recording layer preferably is a thermoplastic or auto-oxidizable resin. Suitable resins may be selected over a broad range of resins and include polycarbonates, poly(methyl methacrylate), polystyrene, polyethylene, poly(ethylene oxide), poly(vinyl butyral), poly(vinyl acetate), nitrocellulose, poly(vinyl alcohol), methylcellulose, and the like. Because of its strong oxidizing activity, nitrocellulose is particularly desirable.

The weight ratio of the metal complex of organic compound to the resin is generally not less than 0.1 percent, preferably not less than 10 percent, and for still better results, not less than 30 percent. If the ratio is too low, neither sufficient light absorbing capacity nor sufficient optical gradation will be obtained.

Figure 2:
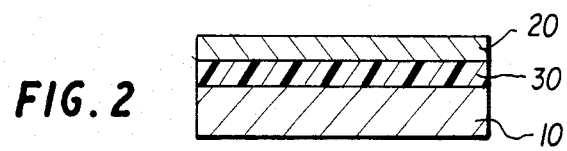
Figure 3:
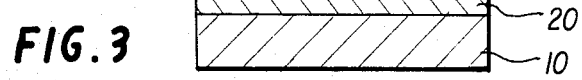
Figure 4:
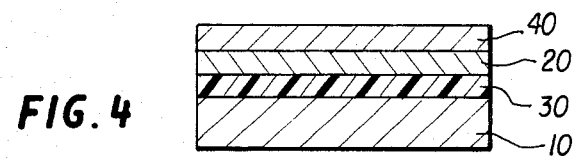
Figure 5:
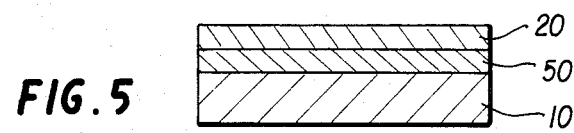
Figure 6:
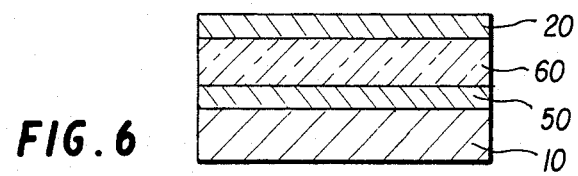

Referring to FIG. 1, the optical information recording medium of the present invention consists essentially of a substrate 10 and a recording layer 20. The recording or readout laser beam is indicated by the arrowmark 100 or 200. If necessary, a subbing layer 30 may be provided on the substrate as shown in FIG. 2 or a protective layer 40, for example made of $SiO_2$, on the recording layer as shown in FIGS. 3 and 4. The subbing layer is preferably made of nitrocellulose. It is further possible, as shown in FIG. 5 to position a reflective layer 50 of a metal such as Al, Ag or Au between substrate 10 and recording layer 20. Or, as shown in FIG. 6, a reflective layer 50 and transparent dielectric layer 60, which may for example be made of $SiO_2$, $Si_3N_4$ or the like, are positioned between substrate 10 and the recording layer. When a reflective layer of a metal is to be provided, an additional process such as vacuum deposition is required and, moreover, as the optical characteristics of the recording medium under conditions of repeated reflection are largely dependent on the thickness of the reflective layer, the thickness of the reflective layer must be carefully controlled. The optical information recording medium of the invention has the very desirable feature that a single reflectivity event or a change in reflectivity, which is necessary for recording and readout, can be obtained even without the positioning of a reflective layer of metal between the substrate and the recording layer.

The recording of information is achieved by irradiation of the optical information recording medium with a laser beam of high energy density. This induces local chemical changes or physical changes in the medium. Thus, the areas of the medium exposed to the laser beam melt, decompose or otherwise are modified by the heat generated by the photo-thermal conversion process. The photo-thermal conversion process results in deformations in the medium, or material is expelled from the medium, thus leaving a record on the recording medium. The formation of pits by laser light can be effected at a low energy level and when the laser beam diameter is focused to about 1 μm, pits are formed by operating in the power range of 1 to 10 mW on the surface of the recording medium for an irradiation time of 50 to 500 n seconds.

In order to read out information, the laser output is attenuated to 1/5 to 1/10 of the recording laser output. Thus, the recorded medium is irradiated continuously with a beam of low output which does not induce any chemical or physical dimensional change in the medium and the variation in reflectivity or transmittance, which is a function of the presence or absence of pits, is detected. Usually, in the preferred design of the system, the pits in the recording layer are detected.

Having generally described this invention, a further understanding can be obtained by reference to certain specific example which are provided herein for purposes of illustration only and are not intended to be limiting unless otherwise specified.

In the following examples, the monoazo compounds employed are identified by the abbreviations shown above for the monoazo compounds disclosed.

EXAMPLE 1

To a solution of TAN in methanol was added an aqueous solution of ferrous ammonium sulfate hexahydrate (Mohr's salt) (½ equivalent). The pH of the solution was adjusted and a water-insoluble iron complex compound was obtained. This complex in chloroform showed an absorption maximum (sometimes referred to briefly as λmax) of 786 nm and a molar absorptivity (briefly, ε) of $1.9 \times 10^4$ l·mol$^{-1}$·cm$^1$.

The above complex was deposited by the vacuum deposition technique to a thickness of 115 nm on a disk-shaped poly(methyl methacrylate) (PMMA) substrate as thick as 1.2 nm. The degree of vacuum used in this deposition procedure was $1 \times 10^{-5}$ Torr and the boat temperature was 300° C.

Figure 7:
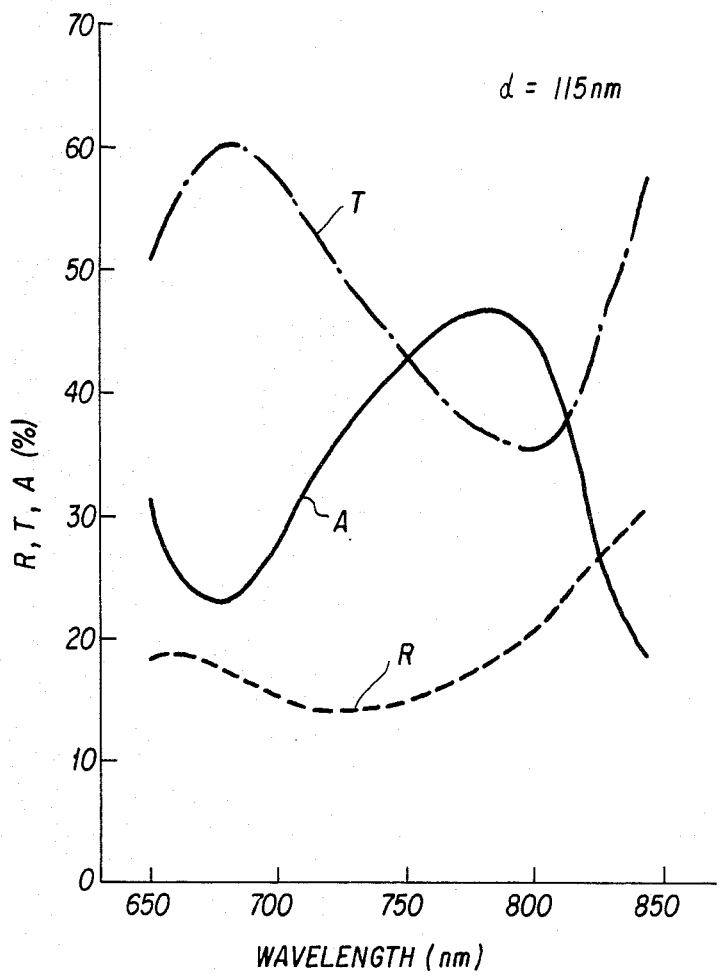
FIG. 7 is a plot showing absorption (A), reflectivity (R) and transmittance (T) with respect to wavelength of radiation in accordance with an embodiment of the present invention.

FIG. 7 shows the transmission (T), absorption (A) and reflection (R) spectra of the above vapor-deposited film as measured using light incident on the substrate side of the disk. It was confirmed that this recording medium had an absorption maximum in the neighborhood of 800 nm and was suitable for use as an optical recording material in semiconductor laser applications.

Figure 8:
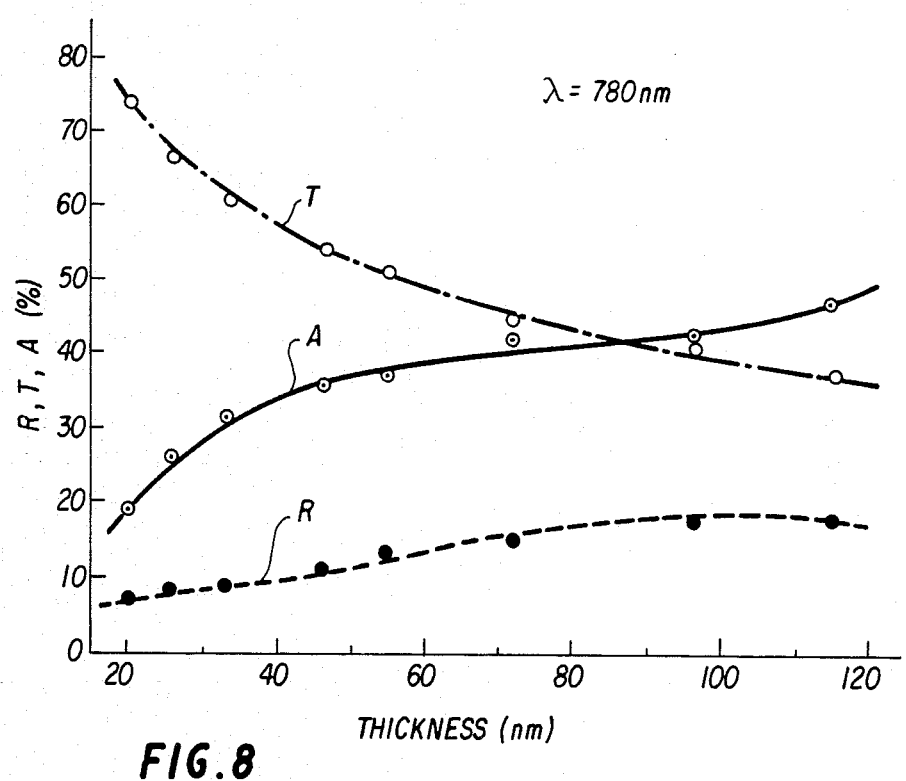

FIG. 8 shows the dependency of T, A and R on film thickness when a semiconductor laser beam (780 nm) is incident on the substrate side. Conversely, when the beam is incident on the recording layer side, R increases while A decreases.

Figure 9:
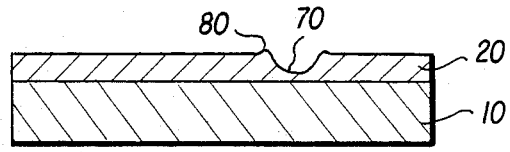

FIG. 1 is a cross-sectional view of the optical information recording medium prepared in the above described manner. This optical information recording medium consists of a PMMA support 10 and a recording layer 20 disposed thereon. This structure was rotated at a linear velocity of 11 m/sec in a recording position and a semiconductor laser beam (780 nm) from the direction indicated by arrow-mark 100 was focused to a beam diameter of 1.2 μm and projected on the recording medium in pulses. The power of the laser beam on the irradiated surface was 6 mW, the recording frequency was 1 MHz, and the duty ratio was 50%. As a result, a row of pits 70 was produced in the recording layer as shown in FIG. 9. As illustrated in the drawing, the pit bottom does not reach the PMMA substrate but the substrate may be exposed when the irradiating energy is relatively large.

Scanning electron microscopic examination revealed that the rim 80 around each pit was small and the shape of the pit was satisfactory.

Then, the rows of recorded pits on the disk rotating under the same conditions as above were irradiated with a continuous semiconductor laser beam at 1 mW for readout by way of changes in the intensity of reflected radiation. It was found that the CNR was 55 dB.

When recording and readout operations were carried out from the recording layer side of a sample medium prepared in the same manner as above, satisfactory playback signals were obtained. When this optical information recording medium was allowed to stand at 40° C. and 95% R.H., no aging was found in the recording and readout characteristics. When, for control purposes, TAN was used in lieu of the above iron complex and the laser was operated under the same conditions as described above, no difference was found in the amount of reflected light between the illustrated area and the non-illustrated area. Satisfactory playback signals were also obtained when a He-Ne laser (633) nm was used in lieu of a semi-conductor laser under the same conditions.

EXAMPLE 2

The same procedure as described in Example 1 was followed except that TAC was used instead of TAN to give an iron complex. In chloroform, this complex had a λmax value of 762 mm and an ε value of $1.4 \times 10^4$ l·mol$^{-1}$·cm$^{-1}$.

Then, at the deposition boat temperature of 260° C., a 90 nm-thick film of the complex was deposited on a PMMA disk. Using this sample, the same experiment as described in Example 1 was carried out except that the recording power was set at 5 mW. The CNR was found to be as good as 53 dB.

EXAMPLE 3

To a 1,4-dioxane solution of TAM was added an aqueous solution of ferrous ammonium sulfate hexahydrate (½ equivalent) and after adjustment of the pH of the solution, the mixture was extracted with chloroform to give an iron complex. In chloroform, this complex showed a λmax value of 760 nm and an ε value of $2.7 \times 10^4$ l·mcl$^{-1}$·cm$^{-1}$.

A N,N-dimethylformamide (DMF) solution of nitrocellulose (viscosity ½ second, nitrogen content 12%) was filtered through a 3 μm membrane filter and spin-coated on a PMMA disk thereby forming a subbing layer having a dry thickness of 800 nm. Then, the above iron complex was dissolved in chloroform and after filtration through a 0.2 μm membrane filter, the solution was spin-coated on the above disk to give a recording layer with a dry thickness of 55 nm. In the same experiment as described in Example 1, this recording medium showed a satisfactory CNR value of 53 dB.

EXAMPLE 4

The iron complex of TAM prepared as described in Example 3 and nitrocellulose were dissolved in N,N-dimethylformamide, and after filtration through a 0.2 μm membrane filter, the solution was spin-coated on a PMMA disk to yield a recording layer having a dry thickness of 70 nm (iron complex content 95%). This medium showed a satisfactory CNR value of 51 dB when used in the same experiment described in Example 2.

EXAMPLE 5

To a 1,4-dioxane solution of BTAEP was added an aqueous solution of ferrous ammonium sulfate hexahydrate (½ equivalent) and the pH of the solution was adjusted thereby resulting in an iron complex. In chloroform, this complex showed a λmax value of 780 nm and an ε value of $2.3 \times 10^4$ l·mol$^{-1}$·cm$^{-1}$. This complex and polyethylene oxide (mol. wt. $\overline{Mw} \geq 4,000,000$) were dissolved in chloroform and, after filtration through a 0.2 μm membrane filter, the solution was spin-coated on a PMMA disk having a 800 nm-thick nitrocellulose subbing layer in the same manner as described in Example 3 to give a recording layer having a dry thickness of 85 nm (iron complex content 95%).

This recording medium shows a satisfactory CNR value of 52 dB when used in the same experiment described in Example 1.

EXAMPLE 6

To a 1,4-dioxane solution of 3,5-DiBr-PAMB was added an aqueous solution of nickel chloride hexahydrate (½ equivalent), and the pH of the mixture was adjusted thereby yielding a nickel complex. In ethanol, this complex showed a λmax value of 646 nm and an ε value of $1.3 \times 10^5$ l·mol$^{-1}$·cm$^{-1}$.

The above complex was then dissolved in N,N-dimethylformamide and the solution was spin-coated on a PMMA disk to give a recording layer having a dry thickness of 55 nm. Using this sample, recording and readout were carried out with a He-Ne laser (633 nm)

under the same conditions described in Example 1. The CNR of this recording medium was satisfactory at a value of 54 dB.

For control purposes, 3,5-DiBr-PAMB was used instead of the above nickel complex and the laser unit was operated under the same conditions as described above. The result was that no variation in reflectivity was found between the irradiated area and the non-irradiated area.

EXAMPLE 7-15

The recording and readout characteristics obtained using other metal complexes are shown in Table 1.

Recording was carried out at a recording frequency of 1 MHz, a duty ratio of 50% and a linear velocity of 11 m/sec. in a recording position. The readout power was invariably set at 1 mW. The recording medium was so arranged that the laser beam was incident on the substrate side. In all these cases, satisfactory CNR values were obtained.

TABLE 1

| Example No. | Monoazo compound | Metal ion | Binder* (complex content 95%) | Thickness of recording layer (nm) | Structure of optical information recording medium* | Laser light wavelength (nm) | Recording power (nW) | CRN (dB) |
|---|---|---|---|---|---|---|---|---|
| 7 | BTAC | $Fe^{2+}$ | — | 70 | PMMA/recording layer | 780 | 6 | 53 |
| 8 | BTAMP | $Fe^{2+}$ | — | 90 | PMMA/NC/recording layer | 780 | 7 | 52 |
| 9 | α-BTAN | $Fe^{2+}$ | NC | 95 | PMMA/recording layer | 780 | 6 | 54 |
| 10 | β-BTAN | $Fe^{2+}$ | — | 80 | Glass/NC/recording layer | 780 | 8 | 50 |
| 11 | TAMP | $Fe^{2+}$ | PEO | 85 | PMMA/NC/recording layer | 780 | 6 | 51 |
| 12 | TAMB | $Cu^{2+}$ | — | 50 | PC/recording layer | 633 | 6 | 52 |
| 13 | BTAMB | $Ni^{2+}$ | PSt | 85 | PMMA/recording layer | 633 | 5 | 50 |
| 14 | 3,5-DiCl—PAMB | $Cu^{2+}$ | — | 55 | PMMA/NC/recording layer | 633 | 6 | 55 |
| 15 | 3,5-DiBr—PAMB | $Co^{2+}$ | PVB | 75 | Glass/recording layer | 633 | 8 | 50 |

*NC: nitrocellulose
PEO: poly(ethylene oxide)
PC: polycarbonate
PSt: polystyrene
PVB: poly(vinyl butyral)

What is claimed as new and is intended to be secured by Letters Patent is:

1. An optical information recording medium which is adapted for the recording and reading out of information by means of laser light, comprising:

a substrate and a recording layer, said recording layer containing a metal complex of a monoazo compound of the formula:

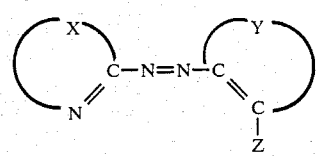

wherein X is a residue which, taken together with the adjacent nitrogen atom and carbon atom, forms a heterocyclic ring; Y is a residue which, taken together with two adjacent carbon atoms, forms an aromatic ring; and Z is hydroxy or carboxy.

2. The optical information recording medium of claim 1, wherein said recording medium is provided with a protective layer.

3. The optical information recording medium of claim 1, wherein a reflective layer is positioned on top of said recording layer.

4. The optical information recording medium of claim 1, wherein a subbing layer is positioned between said substrate and said recording layer.

5. The optical information recording medium of claim 1, wherein said aromatic ring is phenyl or naphthyl.

6. The optical information recording medium of claim 1, wherein the substituent Z is hydroxy.

7. The optical information recording medium of claim 1, wherein said heterocyclic ring is substituted by at least one electron donating group or electron withdrawing group, and wherein said aromatic ring is substituted by at least one electron donating group.

8. The optical information recording medium of claim 7, wherein said at least one electron donating group is a member selected from the group consisting of alkyl and alkoxy.

9. The optical information recording medium of claim 7, wherein said at least one electron donating group is a member selected from the group consisting of substituted or unsubstituted amino and hydroxy.

10. The optical information recording medium of claim 7, wherein said at least one electron withdrawing group is a member selected from the group consisting of halogen, nitro, cyano, trifluoromethyl and carboxy.

11. The optical information recording medium of claim 1, wherein said heterocyclic ring is a member selected from the group consisting of thiazolyl, benzothiazolyl, pyridyl, quinolyl, pyrimidyl and hydroxybenzothiazolyl.

12. The optical information recording medium according to claim 11, wherein said heterocyclic ring is thiazolyl or benzothiazolyl.

13. The optical information recording medium according to claim 1, wherein said recording layer is entirely composed of said metal-monoazo compound complex.

14. The optical information recording medium of claim 13, wherein said metal is an iron group element.

15. The optical information recording medium of claim 14, wherein said iron group element is iron.

16. The optical information recording medium of claim 1, wherein said recording layer is a mixture of said metal-monoazo compound complex and at least one other material.

17. The optical information recording medium of claim 16, wherein said other material is a resin.

18. The optical information recording medium of claim 17, wherein said resin is an auto-oxidizable resin.

19. The optical information recording medium of claim 18, wherein said auto-oxidizable resin is nitrocellulose.

20. The optical information recording medium of claim 17, wherein said resin is a thermoplastic resin.

21. The optical information recording medium of claim 20, wherein said thermoplastic resin is a member selected from the group consisting of poly(methyl methacrylate), polystyrene, polyethylene, poly(ethylene oxide), poly(vinyl butyral), poly(vinyl alcohol) and poly(vinyl acetate).

22. The optical information recording medium of claim 16, wherein said metal is an iron group element.

23. The optical information recording medium of claim 22, wherein said iron group element is iron.

24. The optical information recording medium of claim 1, wherein said substrate is made of inorganic material.

25. The optical information recording medium of claim 24, wherein said inorganic material is a member selected from the group consisting of glass, ceramics, aluminum and aluminum alloys.

26. The optical information recording medium of claim 1, wherein said substrate is formed of synthetic resin.

27. The optical information recording medium of claim 26, wherein said synthetic resin is poly(methyl methacrylate) or polycarbonate.

28. The optical information recording medium of claim 1, wherein a reflective layer is positioned between said substrate and said recording layer.

29. The optical information recording medium of claim 28, wherein a transparent dielectric layer is positioned between said reflective layer and said recording layer.

* * * * *